United States Patent
Healey

(10) Patent No.: US 8,818,201 B2
(45) Date of Patent: Aug. 26, 2014

(54) OPTICAL COMMUNICATION

(75) Inventor: Peter Healey, Ipswich (GB)

(73) Assignee: British Telecommunications plc, London (GB)

( * ) Notice: Subject to any disclaimer, the term of this patent is extended or adjusted under 35 U.S.C. 154(b) by 534 days.

(21) Appl. No.: 12/739,464

(22) PCT Filed: Oct. 23, 2008

(86) PCT No.: PCT/GB2008/003612
§ 371 (c)(1),
(2), (4) Date: Apr. 23, 2010

(87) PCT Pub. No.: WO2009/053708
PCT Pub. Date: Apr. 30, 2009

(65) Prior Publication Data
US 2010/0310252 A1    Dec. 9, 2010

(30) Foreign Application Priority Data
Oct. 24, 2007   (EP) .................................... 07254227

(51) Int. Cl.
| | |
|---|---|
| *G02F 1/00* | (2006.01) |
| *G02F 2/00* | (2006.01) |
| *H01S 3/00* | (2006.01) |
| *H04B 10/00* | (2013.01) |
| *H04J 14/00* | (2006.01) |
| *H04J 3/16* | (2006.01) |
| *H04B 10/032* | (2013.01) |
| *H04J 3/06* | (2006.01) |

(52) U.S. Cl.
CPC ............. *H04J 3/0682* (2013.01); *H04J 3/1694* (2013.01); *H04B 10/032* (2013.01)
USPC ............ 398/168; 398/1; 398/2; 398/3; 398/4; 398/5; 398/6; 398/7; 398/8; 398/153; 398/158; 398/159; 398/160; 398/161; 398/162

(58) Field of Classification Search
CPC ...... H04B 10/00; H04B 10/50; H04B 10/502; H04B 10/54; H04B 10/541; H04B 10/564; H04J 1/00; H04J 1/08; H04J 1/18
See application file for complete search history.

(56) References Cited

U.S. PATENT DOCUMENTS 5,912,998 A * 6/1999 Quayle ........................... 385/24
6,151,144 A * 11/2000 Knox .............................. 398/79
(Continued)

FOREIGN PATENT DOCUMENTS

| EP | 1 231 812 | 8/2002 |
| EP | 1 231 813 | 8/2002 |

(Continued)

OTHER PUBLICATIONS

International Search Report for PCT/GB2008/003612, mailed Jan. 27, 2009.

*Primary Examiner* — Darren E Wolf
(74) *Attorney, Agent, or Firm* — Nixon & Vanderhye PC

(57) ABSTRACT

This concerns a protected long-reach PON having a plurality of terminals connected to a distribution network that is fed by both a main and back up feed, each feed including a head end and a repeater. The back up head end had access to a ranging table with data previously obtained by the main head end, thereby speeding up the switch over in the event of a fault with the main feed. In one embodiment, the repeater has a virtual ONU therein, allowing the back up repeater to be ranged by the back up head end, thereby yet further speeding up the ranging procedure. The main and back up repeaters are sufficiently equidistant from the distribution network to allow the back up head to perform normal scheduling without performing a ranging operation on each of the terminals, even if the different terminals transmit at slightly different wavelengths. This is achieved using the ranging information obtained with regard to the back up repeater.

17 Claims, 5 Drawing Sheets

(56) References Cited

U.S. PATENT DOCUMENTS 7,155,089 B1 * 12/2006 Chi et al. .................. 385/30
2002/0071149 A1    6/2002 Xu et al.
2002/0109876 A1 *  8/2002 Eijk et al. ................ 359/110

FOREIGN PATENT DOCUMENTS

WO      2005/117300      12/2005
WO   WO 2005/117300     12/2005

* cited by examiner

OPTICAL COMMUNICATION

This application is the U.S. national phase of International Application No. PCT/GB2008/003612 filed 23 Oct. 2008, which designated the U.S. and claims priority to European Application No. 07254227.7, filed 24 Oct. 2007, the entire contents of each of which are hereby incorporated by reference.

BACKGROUND

1. Technical Field

The present invention is concerned with an optical communications system, in particular a protected optical communication system having a main supply arm and a back up supply arm.

2. Related Art

In a so-called Passive Optical Network or PON, a plurality of terminals are connected to a supply arm by a distribution network having a plurality of splitter junctions arranged in a tree structure. The supply arm is normally formed by a head end arranged along an optical path, and, in the case of a long reach PON, may include a repeater. For fault tolerance purposes, it is known to provide a back up supply arm, also connected to the distribution network. The back up supply arm duplicates the function of the main supply arm, so that if a fault occurs in the main supply arm, the back up supply arm can take over. However, the back up supply arm is normally required to perform an initialisation routine when it takes over. This initialisation routine can involve a ranging procedure which can be excessively time consuming.

SUMMARY

According to the present invention, there is provided a method of operating an optical communications system having: a plurality of terminals; a main network arm with a main head end unit for communicating with the terminals in an operational state; a back up network arm with a back up head end unit arranged to allow communication with the terminals in the event that the main network arm is faulty, the main and back up network arms having respectively a main repeater and a back up repeater, at least the back up repeater being responsive to signals from the back up head end unit so that the back up repeater can be ranged, the method including: at the main head end unit, performing a ranging procedure so as to acquire synchronisation information for the scheduling of the transmissions from the terminals; performing a ranging procedure at the back up head end unit in order to acquire synchronisation information in respect of the back up repeater; and, in the event that the main network arm is detected to be faulty, using at least part of the synchronisation information obtained at the main head end unit together with the synchronisation information respect of the back up repeater so as to schedule transmissions from the terminals to the back up head end unit Because at least at least part of the synchronisation information obtained at the main head end unit is used together with the synchronisation information in respect of the back up repeater, the back up head end unit can synchronise the terminals quickly in order that these can communicate with the head end unit using a time division multiplexing protocol. Furthermore, because a ranging procedure at the back up head end is performed in order to acquire synchronisation information in respect of the back up repeater, this ranging can be performed when the main network arm is operation, thereby further reducing the disruption caused if handover occurs from the main to the back up network arm.

Further aspects of the invention are specified in the claims.

BRIEF DESCRIPTION OF THE DRAWINGS

The invention will now be further described, by way of example only, and with reference to the following drawings in which:

FIG. 1b shows details of an OLT shown in FIG. 1a

DETAILED DESCRIPTION OF EXEMPLARY EMBODIMENTS

Figure 1A:
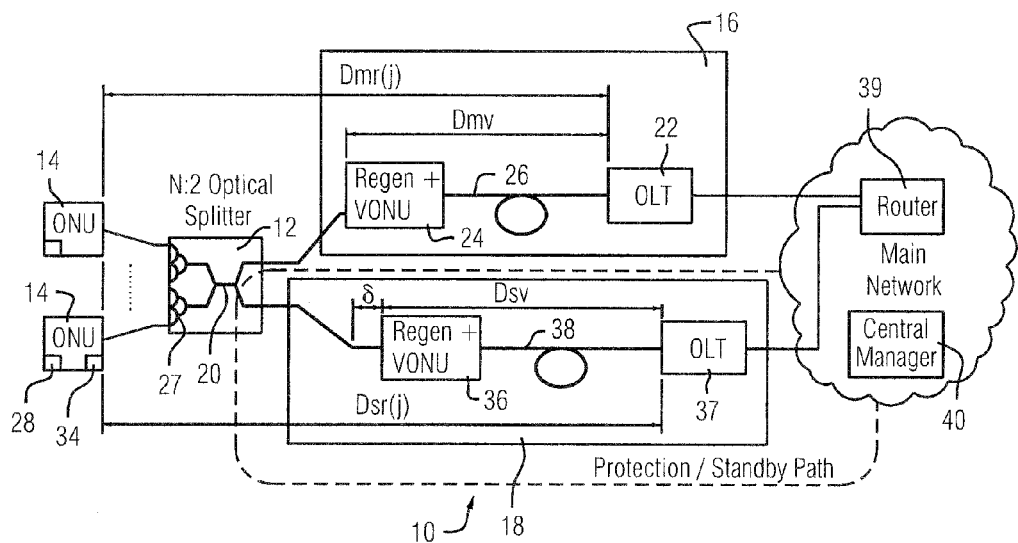
FIG. 1a shows an optical network in accordance with the present invention.

FIG. 1a shows a protected optical communications system 10 having a distribution network 12 for distributing optical signals to a plurality of terminals or optical ONUs, referred to herein as ONUs 14. Signals are supplied to the distribution network by a main supply arm 16 during normal operation. However, a back up supply arm 18 is also connected to the distribution network via an optical splitter 20, such that if a fault occurs in the main supply arm, the back up supply arm can supply the signals to the distribution network instead.

The main supply arm 16 has a head end 22, also know as an optical line terminal or OLT for generating optical signals for and receiving signals from the ONUs 14. A repeater 24 is situated along an optical path 26 extending between the distribution network and the OLT, for compensating for loss and degradation of data along the optical path. In this example, the optical path is an optical fibre path, typically formed from single mode fibre. The repeater is typically located a significant distance from the OLT, for example at least 50 km or at least 100 km therefrom.

The distribution network has a plurality of splitter junctions 27 arranged in a tree structure for distributing signals from the OLT to the ONUs. In the present example, the distribution network 12 has a first passive optical splitter connected to the main path, which distributes the incoming light from the main path to a plurality of branch paths, each of which is connected to a respective further splitter. Although the further splitters in FIG. 1a are shown as having a two way split, these will typically have an 8-way split, providing a connection to 256 ONUs. Yet further levels of split (not shown) may be provided so that a greater number of ONUs can be connected to the OLT.

Each ONU is provided with an optical source 28 for transmitting signals in an upstream direction towards the OLT, in the form of short data bursts. The ONUs are each arranged to transmit bursts of data in response to scheduling instructions or "grants" from the OLT, and to generally refrain from transmitting data in the absence of grants.

Figure 1B:
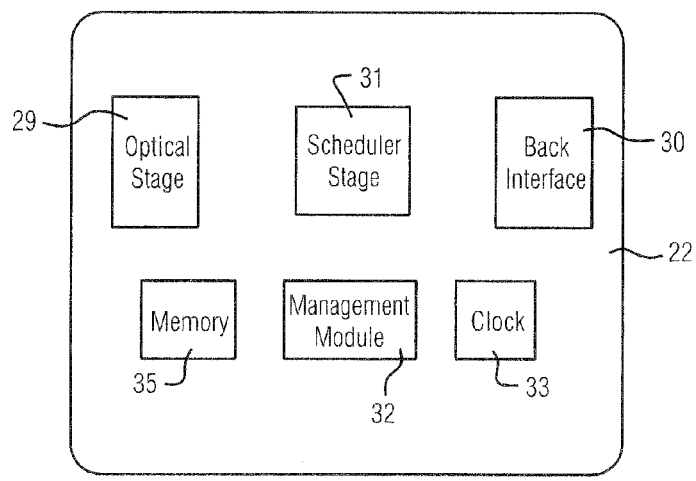

The OLT is shown in more detail in FIG. 1b. The OLT has: an optical stage 29 for transmitting and receiving optical signals to and from the distribution network; a back interface 30 for communicating with an external network; a scheduler stage 31 for controlling the transmissions from the ONUs;

and an Element Manager or EM implemented as a management module 32, for controlling one or more aspects of the OLT operation.

The management module 32 is arranged to generate status data based on various indicators of the performance of the optical communications system, and to pass this data to the back interface for external transmission. Examples of indicators may include the signal levels of received optical signals, or the results of local tests carried out automatically by the management module at the OLT. The management module is also arranged to receive external command signals over the back interface, and to perform specified actions in response to these external signals.

The scheduler stage 31 is configured to generate the grants which control the transmissions from the different ONUs. The grants transmitted from the OLT contain an instruction for a given ONU to transmit data for a predetermined time interval at a predetermined time, with respect to a centralised time (although other in other protocols data transmission is timed with respect to the local arrival time of a control signal).

A clock unit 33 is provided to allow the scheduler stage to time the grants such that there is essentially no risk (or a reduced risk) that upstream bursts from one ONU will collide or overlap with a burst from another ONU where optical paths are combined at a splitter. Thus, the scheduler stage schedules the ONU transmissions such that the necessary timing function for temporally interleaving data from different ONUs is carried out remotely from the junction at which the data is temporally interleaved, in the way that multiplexing is normally carried out in a Passive Optical Network or PON. The OLT can then access data from each ONU using a TDMA (Time Division Multiplexed Access) protocol.

Each ONU has a respective timing unit 34 for measuring the time at which a data burst is to be transmitted in response to an instruction from the OLT. Each ONU 14 will normally be connected to customer equipment such as telephony equipment or other communications equipment (not shown), and will be arranged to buffer data from the customer equipment in order to transmit it at the correct time in the upstream direction.

The ONUs each have an address or identity associated therewith issued by the OLT, and the OLT is arranged to transmit broadcast instructions which associate given data with a given address. Each ONU is arranged to monitor the broadcast information from the OLT, to capture data addressed to it, and to forward the captured data towards the correct customer equipment.

To take into account the transit times from different ONUs, the OLT, in particular the scheduler stage thereof, is arranged to effect a "ranging" procedure in which the scheduler stage instructs a selected ONU to return a signal after a specified amount of time or immediately after receiving an instruction. The scheduler stage is arranged to calculate the round trip time, that is, the elapsed time between the transmission of the instruction and the arrival of the return signal. The round trip times will normally be different for the different ONUs. Therefore, on the basis of the respective round trip times, the OLT is arranged to calculate a differential delay offset (also known as the equalisation delay) for each ONU. The delay offset is calculated such that the sum of the transit time from an ONU plus the delay offset for that ONU is the same for each ONU. The scheduler stage is arranged to transmit the respective delay offset to each ONU. Each ONU can then delay their response to grants with the relevant delay offset such that the ONUs respond to the OLT as if they were located at the same distance from it (in an alternative embodiment, the scheduling stage may simply take into account the relevant round trip time directly when transmitting a grant to a network element). The scheduler stage has access to a memory location 35 for storing each offset (or each round trip time) in association with the identity of the relevant ONU in the form of a ranging table. The ranging procedure is normally carried out in an initialisation phase, when the optical system is starting up.

In addition to providing the delay offsets, the measurement of the round trip time allows the scheduler stage to properly time or otherwise synchronise the transmission of a given grant for an ONU with the time at which the response from that ONU needs to be received.

The repeater has a "virtual" ONU incorporated therein (details of which are given further below), such that the repeater can be addressed by the OLT in the same manner as a real ONU. In particular, the repeater is configured such that it can be ranged in the same manner as a real ONU, and has a round trip time and delay offset determined by the OLT. In addition, the repeater performs the conventional function of converting at least incident upstream optical signals into the electrical domain before re-transmitting the signals in the optical domain towards the OLT using a common optical source transmitting at a common wavelength.

The back up supply arm has the same components as the main supply arm, namely a backup repeater 36, and a backup OLT 37, each of which is connected to the distribution network by a backup optical path 38. The back up OLT has corresponding components to those of the main OLT for performing corresponding functions. Likewise, the main and backup repeaters have corresponding components to one another for performing corresponding functions.

Returning to FIG. 1*a*, the main OLT and the back up OLT are typically located a different geographical locations, separates for example by over 1 km, so that their respective supply paths can follow diverse routes. Because the main OLT and the back up OLT are geographically separate, these are each connected at their respective back interfaces 30 to a core telecommunications network for communicating data traffic to and from the optical system. The main and backup OLTs are connected to a common router 39 which is able to selectively route traffic to the back up supply arm and main supply arm. Within the telecommunications network there is provided an Operational Support System or OSS implemented in a central manager unit 40, which is connected through the network to each of the OLTs so as to control their operation, at least in part on the basis of status data received from the OLTs. The central manager unit is also operatively connected to the common router so as to control which of the two OLTs traffic is directed to.

In normal operation, that is, in the absence of a fault which cannot be sufficiently quickly rectified, the back up supply arm is idle and the main supply arm carries traffic to and from the distribution network. However, in response to status data being received indicative of a fault in the main supply arm, the central manager unit 40 is arranged, in a handover procedure, to close down the main supply arm, activate the back up supply arm, and, once activated, direct traffic thereto.

As part of the handover procedure, the central manager 40 is arranged to instruct the main OLT, in particular the management stage thereof, to return a message to the central manager 40 containing a copy of the ranging table stored in the memory of the scheduler stage. The central manager 40 then forwards this ranging table to the back up OLT, the management module of which stores the ranging table in the memory of the local scheduler stage. The back up OLT can then use the information in the ranging table in the initialisation phase, thereby reducing the need for a full ranging procedure to be carried out by the back up OLT when it is activated.

The ONUs, OLTs, repeaters and the central manager unit will each be implemented in hardware including one or more processors having access to at least one memory.

In more detail, the ranging table at the main OLT contains the round-trip delays for the virtual ONU located at the repeater and also those of the 'real' ONUs connected to the distribution network. The scheduler stage of the back up OLT is arranged to pre-calculate the round-trip delays for all ONUs and create its own ranging table. This reduced the need to transmit updated values to the ONUs. The back up OLT can do this because the respective virtual ONUs at the main and back up repeaters are at approximately the same relative delay from each the 'real' ONUs (plus or minus a small fixed offset which can be made negligible if the repeaters are co-located). Since the back up OLT has already determined the round trip delay to the virtual ONU of the back up repeater, it can simply calculate the round trip delay to the ONU connected to the distribution network. Then, rather than send new values to the ONUs, it can adjust its own timing to match those already registered in the ONUs and hence speed up the protection switching process. Alternatively, the back up OLT could transmit new ranging delays to all of the ONUs without having to go through a full ranging procedure (a procedure that normally takes several seconds). Analytically, these considerations can be represented as follows:

Let the round-trip delay to the main repeater be $D_{mv}$, and that to the corresponding 'real' ONUs be $D_{mr(j)}$. Where (j) corresponds to real ONU j. The main OLT measures $D_{mv}$ and $D_{mr(j)}$, so can transfer this information to the standby OLT via the PON management systems.

The standby OLT measures the round-trip delay to the standby VONU, let this value be $D_{sv}$. Thus, The standby OLT can calculate the round-trip delays to all real ONUs, $D_{sr(j)}$, by using the following simple formula (see FIG. 1a):—

$$D_{sr(j)}=D_{sv}+D_{mr(j)}-D_{mv}+\delta$$

Where δ is the fixed range offset between the main and standby VONUs and the real ONUs. There are three options for dealing with δ:
1. VONUs could be co-located so that δ is smaller than the ranging tolerance so it can be ignored.
2. δ could be measured during PON installation (and/or when the main supply arm is in the operational state) and then stored in the standby PON VONU or its associated OLT.
3. The standby OLT could measure $D_{sr(j)}$ for one real ONU (say j=1) during initial switching to the standby path, then calculate $\delta=(D_{sr(j)}-D_{sv})-(D_{mr(j)}-D_{mv})$.

The positions of each of the main repeater and the back up repeater along each of their respective optical paths from the distribution network is important in determining which steps are carried out in the initialisation of the back up OLT. This is because the ONUs are unlikely to transmit at exactly the same wavelength due to tolerances in the fabrication process of their optical sources. The sources will generally operate within a specified wavelength range, typically from 1260 nm to 1360 nm, so that the wavelength span a range of at least 10 nm, or at least 100 nm. The dispersion along the optical path and the resulting group delay variation could therefore in principle change the differences in round trip time from ONU to ONU when handover takes place between the main supply arm and the back up supply arm. However, a repeater effectively fixes the differences in propagation delay between ONUs, because the repeater re-transmits the signals at a common wavelength. As a result, if the main and backup repeaters are sufficiently closely equidistant from the distribution network i.e, if δ is sufficiently small, the effect of dispersion can be ignored. Whether this criterion is met can be determined by a simple calculation based on the specified wavelength range, the dispersion properties of the transmission medium and the timing tolerance of the communication protocol.

The constant timing offset δ could thus be determined by performing a ranging operation involving a round trip time measurement on a terminal or the back up repeater (the main repeater will have been ranged preferably for use in the normal operational state). Performing a ranging operation on the back up repeater has the benefit that this can be done when the main supply arm is operation, thereby reducing the down-time on handover from the main to back up supply arm.

In order to understand how the timing tolerances in the present system arise, it is helpful to consider how that data in the upstream and downstream directions is transported.

Figure 2:
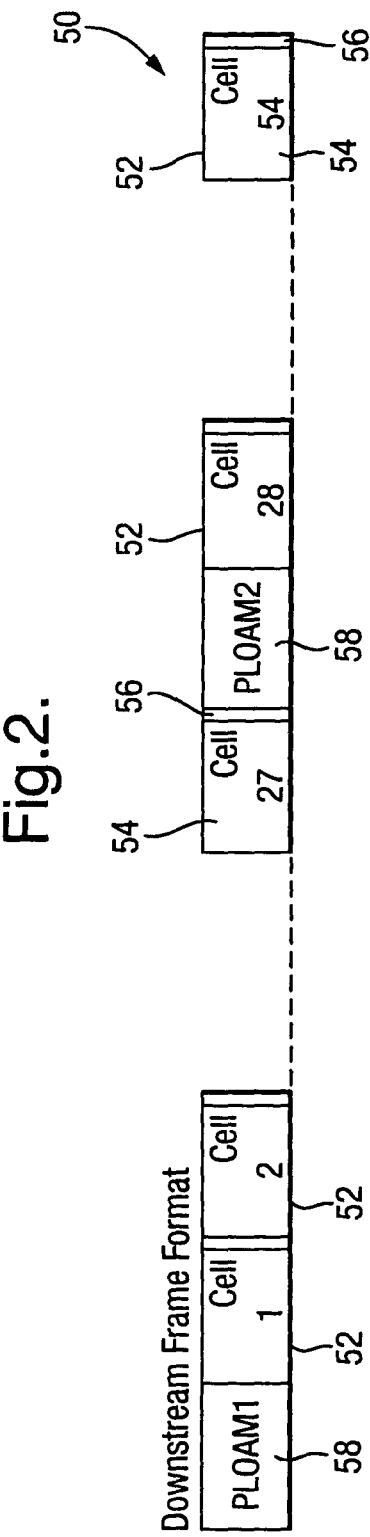
FIG. 2 shows a downstream frame structure for communication in the optical network of FIG. 1.

Both upstream and downstream data in arranged as a series of cells arranged in a frame structure. An example of a frame structure for downstream traffic transmitted by the OLT is shown in FIG. 2. A frame 50 includes a plurality of sequentially arranged data cells or time slot 52, each of which has a data payload 54 for carrying traffic data intended for costumer equipment, and a header 56, which header includes protocol-specific fields for defined types of information, such as an identifier field for the identity of the ONU for which a given data cell is intended (each ONU is arranged to forward data in the payload to customer equipment, whereas data in the head is not normally so forwarded). Signalling cells 58 are provided between some of the data cells at predetermined positions within a frame (in the present example, two signalling cells and 54 data cells are provided per frame). The signalling cells (also known in some protocols as PLOAM or "Physical Layer Operation, Administration and Maintenance" cells) contain the scheduling instructions (also know as "grants") from the OLT which allow one or more specified ONUs to transmit a specified number of upstream data cells at a respective specified time. The signalling cells also contain dedicated fields for synchronisation information to allow the ONUs to achieve synchronisation. Additional fields are provided for ranging, error control, security and information relating to maintenance functions. Examples of known protocols for governing signalling, traffic transmission and other aspects of network operation include the ITU standard G983.1 and G983.4.

Figure 3:
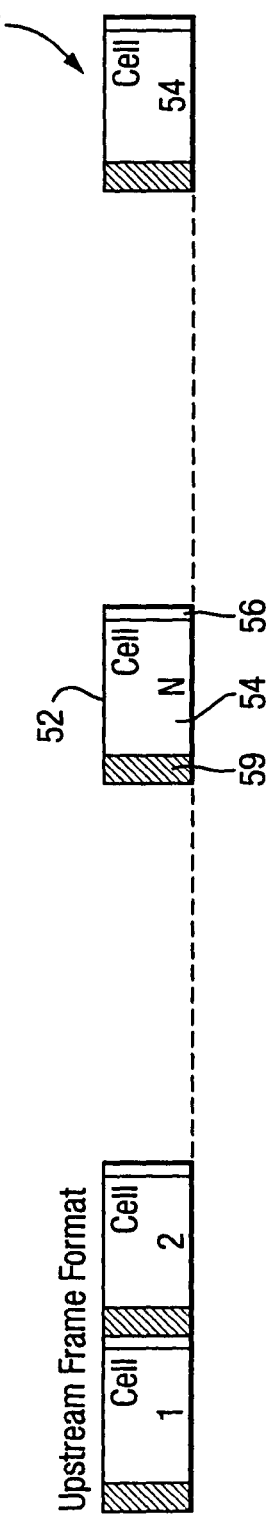
FIG. 3 shows an upstream frame structure.

In the upstream direction, the ONUS are instructed, by means of the downstream signalling cells, to each transmit upstream data cells at an appropriate time so that the cells from the different ONUs come together at a junction in an interleaved fashion so as to form a downstream frame structure, as shown in FIG. 3. Guard bands 59 are provided between the cells to allow for timing irregularities. It can be seen that the timing tolerance referred to above is provided by the guard bands, since if there are timing irregularities that are greater that that provided by the guard bands, consecutive cells may overlap. That is, in the absence of the back up repeater, it could be possible that, because of the difference in the respective path lengths of the main and back up supply arms, the transit time offsets between different outstations is be changed along the back up arm (relative to the offsets when signals travel along the main supply arm) to such an extent that cells from different terminals (which were properly ranged by the main head end) overlap when the back up supply arm takes over. In other words, the changes in the transit time offsets would exceed the guard band time between cells (it being, understood that the guard band time is a time which a head end allows between cells to allow for timing errors or fluctuations, with the result that the actual time between cells is likely to vary depending on these timing errors or fluctuations). To reduce the likelihood of cells overlapping on handover due to the effect of dispersion it is thus helpful to have the difference in path length between the optical distribution network on the one hand and the back up and head end repeaters on the other sufficiently small in relation to the span of the wavelengths (that is, maximum wavelength difference) of the terminals. However, dispersion is independent of the path length between a head end and a repeater, since a repeater will receive transmissions from different terminals at different wavelength, but re-transmit these transmissions at a common wavelength.

In the present example, the guard bands are about 6 ns in length. The group delay variation over 50 km of standard fibre single mode optic fibre (SMF28) for the wavelength range 1260 nm to 1360 nm is approximately 6.3 ns. Thus, this is about the same as the timing resolution of the PON electronics and so leaves little room for other factors (for which the guard band is intended) such as timing drift in the ONU electronics.

It is expected that the group delay variation should be less than ~20% of the maximum allocated for timing resolution, so as to leave room for other factors such as those mentioned above. As delay variation scales linearly with length, it expected that for the group delay variation to be safely neglected on handover, the maximum path length difference between each repeater and the optical distribution network should be about 10 km. That is, the repeaters should be equidistant from the point where the optical distribution network begins (i.e., has its first optical splitter) to within +/−5 km.

It should be noted that one needs to range the back up repeater in any case in order for its OLT to be able to talk to it and check that it is working properly. It should be fully functional before hand-over so that the hand-over can be fast. From the above discussion, it is clear that is that if the 'delta distance' δ shown on the diagrams is between ~0.6 m and ~10 km then one would only need to range one real ONU in order to be able to calculate the new ranging table for all ONUs. This will reduce the hand-over delay.

It should be noted that one only needs to consider the wavelength dependant range delay for the upstream direction, as the wavelength spread 1260 nm-1360 nm only applies in the upstream direction (down-stream transmission from the OLT is at wavelength of 1490 nm).

Consecutive cells may or may not originate from the same ONU. Although the frame structure of FIG. 3 is shown as a series of consecutive cells, some cells may be omitted, for example if one or more ONUs is not instructed to transmit data. The signal stream formed by consecutive frames may appear as spaced apart data bursts (each formed by one or more cells), rather than a continuous signal.

The upstream data cells each have a payload 54 and a header 56, in a similar fashion to the downstream data cells. However, the protocol-specific fields in the upstream direction will normally be different to those in the downstream direction, and include respective fields for; a ONU serial number; inscription keys; and, parity checking (error correction). In addition, the header includes one or more management fields for management information.

Figure 4:
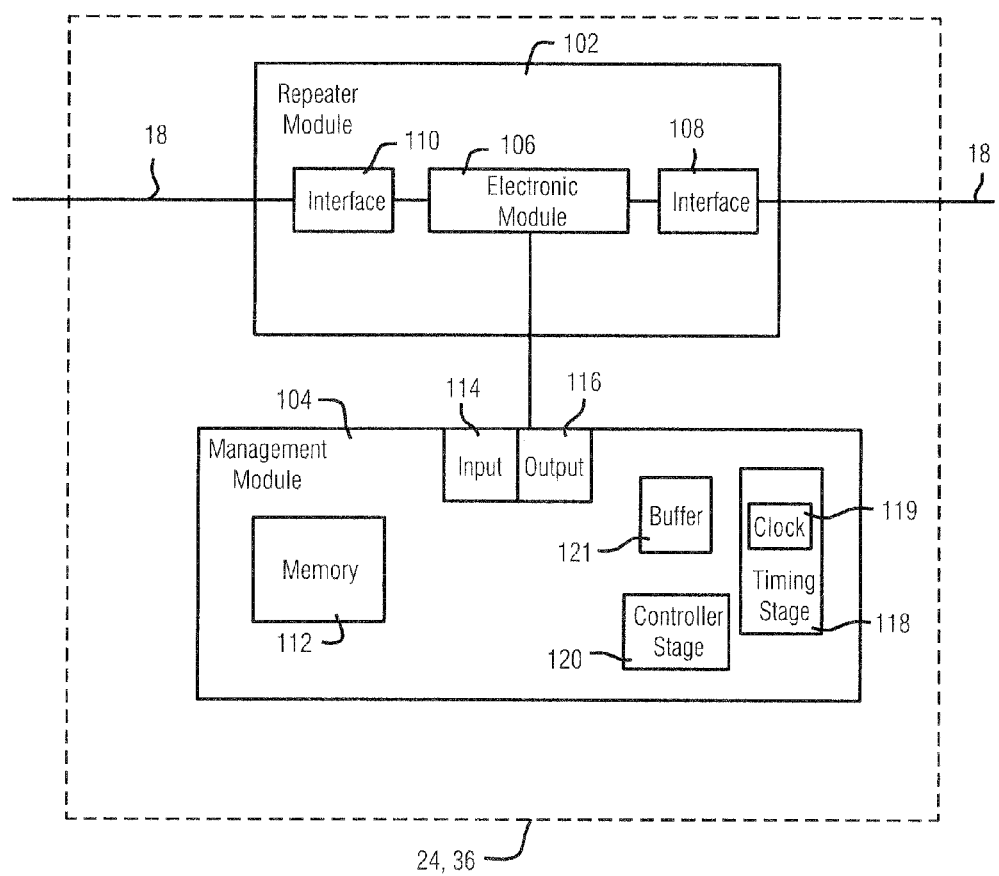
FIG. 4 is a block diagram of a repeater for use in the optical network of FIG. 1.

A more detailed view of the main repeater is shown in FIG. 4 (the back up repeater has corresponding components). The repeater comprises a repeater module 102, which operates largely as a conventional repeater, and a management module 104 for performing management functions with regard to the repeater module 102. The repeater module 102 includes an electronic module 106, and respective upstream and downstream opto-electrical interfaces 108, 110, each for converting incoming optical signals into the electrical domain and for converting electronic signals from the electronic module 106 into optical signals (that is, the upstream interface receives and transmits optical signals from and to the OLT, whilst the downstream interface receives and transmits signals from and to the ONUs). In operation, downstream signals from the OLT are converted into the electrical domain and processed by the electronic modulator 106 before being converted back into the optical domain and transmitted towards the ONUs. The electronic module is arranged to; re-shape; re-time; and, re-amplify signal pulses (or at least perform some of these tasks) in order to compensate for loss and distortion of the signal as it travels along the optical fibre path. In this way, the repeater module reproduces, repeats or otherwise regenerates at least in part the information content of optical signals. The electronic module 106 also performs a regeneration function in respect of downstream traffic, but as part of this regeneration, is arranged to at least in part even out the amplitude of data from the different ONUs, in order to compensate for the fact that the signal from different ONUs is likely to have suffered different amounts of attenuation, due to their different path distance to the repeater.

The management module 104, which is electrically connected to the repeater module 102, is arranged to monitor certain attributes relating to the management or operation of the repeater module, and to report the results as management data to the OLT. Examples of management data include details of one or more of the following: incoming optical power from the ONUs; incoming optical power from the OLT; power level of signals transmitted to the ONUs; power level of signals transmitted to the OLT; power supply voltage(s); temperature at one or more locations; and, error performance. Additionally or alternatively, the management data may include an alarm signal generated in dependence on the values of one or more of the monitored attributes.

The management module 104 is arranged to communicate with the OLT using the same communication protocol as that used by the ONUs. In particular, with regard to communication in the downstream direction, the management module is arranged to monitor a copy of the signal stream in the electrical domain and read data cells addressed to it, in an analogous fashion to the way in which the ONUs each receive a copy of the signal stream in the optical domain. For communication in the upstream direction, the management module 104 is arranged to insert data cells into the data stream in the electrical domain, correctly timed in accordance with scheduling instructions from the OLT, again in an analogous fashion to the ONUs. Thus, the management module 104 can be viewed as a virtual ONU or ONU, allowing existing functionality at the OLT to be employed in order to communicate with the repeater.

The management module 104 includes: a memory 112 for storing management data obtained as a result of the monitoring of the repeater module; an input 114 for receiving a copy of the downstream signal stream from the OLT; an output 116 for inserting data into the upstream signal stream; a timing stage 118 for controlling the timing of data onto the upstream signal stream; and, a controller stage 120 for controlling the operation of the management module 104. The controller stage 120 is operatively coupled to the electronic module 106 and/or one or both of the upstream and downstream opto-electrical interfaces 108, 110 in order to perform the required monitoring functions necessary to collect the management data for storage in memory 112.

The controller stage 120 is configured to read the signalling cells from the OLT, and in response to scheduling instructions in a signalling cell, to transmit one or more data cells at a time specified by the scheduling instructions. The timing of the transmission of the data cells is governed by the timing stage 118, which includes a clock unit 119 synchronised to a master clock at the OLT using the transitions in the data stream and synchronisation information in the signalling cells. The frame synchronisation is achieved by the controller stage through the monitoring of frame synchronisation signals in the signalling cells.

The management module has a short term buffer 121 for delaying the transmission of data by an adjustable offset delay time. The controller stage 120 is responsive to offset signals in the signalling cells so as to adjust the buffer delay to a delay time specified in the offset signals. The real ONUs 14 also each have an adjustable buffer (not shown). This allows the OLT to adjust the adjustable buffer of each ONU and likewise that of the management module so as to take into account the different path lengths and hence transit times from each ONU and the repeater. In a set-up phase, a ranging function is normally carried out to calculate the required value of offset delay time for each ONU as well as for the repeater.

In the ranging function carried out in respect of the repeater, a ranging instruction is broadcast with an address corresponding to that of the repeater, in response to which the management module sends a return message. The OLT then calculates the round trip time from the arrival time of the return message, and hence determines the required offset value for the management module of the repeater (from the round trip time, the optical path distance of the repeater from the OLT can also be inferred). A corresponding ranging function is performed in respect of each ONU.

The control stage is also responsive to buffer adjustment signals (transmitted within a predetermined field of the signalling cells) which instruct the controller stage to adjust the buffer delay so as to compensate for small variations in transit time during normal operation, and thereby maintain synchronisation.

In order to transmit management data, the control stage 120 is arranged to extract the required data from the memory 112 and pass this data to the short term buffer 121, from which it is inserted into the header of one or more data cells, in particular into the protocol-specific management field(s) of the header. Although the management data could simply be inserted into the payload of a data cell, by inserting this data into management-specific fields, use can be made of existing management functionality associated with the OLT for managing the real ONUs.

In addition to the protocol-specific instructions from the OLT, the management module may also receive supervisory or other maintenance instructions in one or more data cells addressed to it (the maintenance instructions need not be specific to the operating protocol of the PON). The maintenance instructions may for example instruct the repeater to alter the optical power output to the ONUs, and/or to the OLT, or control other attributes of the repeater operation. The repeater may include a redundant electronic module or redundant parts thereof, or other components such as a redundant opto-electronic interfaces for fault tolerance. In such a situation, the management module will be configured to perform a switching function, switching the repeater in response to fault instructions from the OLT such that the repeater uses one or more of the redundant components.

The management module is configured to respond to other instructions from the OLT in accordance with the operating protocol of the PON. For example, the management module has a serial number permanently stored therein (for example on a read-only memory written during manufacture), which, in an initialisation phase, the management module will transmit to the OLT, in order that the OLT can allocate to the management module an identifier, (which identifier the management module commits to memory) so that the management module can be addressed by the OLT using the identifier, for example when being granted upstream bandwidth through scheduling instructions from the OLT, in a similar fashion to the ONUs.

During normal operation of the PON, the management module will appear to the OLT like each of the other ONUs, and thus can be invited to transmit data using the scheduling instructions in the signalling cells. Thus, when management data from the management module is required, the management module can be schedule in the normal way to transmit one or more data cells in otherwise empty time slots in the frame structure of FIG. 3.

Although in the above embodiment a synchronous PON system is described, protocols relating to asynchronous systems are also possible. For example, the OLT may simply send instructions for a ONU to transmit data after a specified delay, which delay is measured from the time at which the ONU receives the instructions, rather than with respect to an absolute time. Of course, the management module will need to be adapted to the particular protocol in use with a given PON.

The repeater 24, 36 may be used as a wavelength shifter, for example by arranging the opto-electronic interfaces 108, 110 such that light received at one wavelength by one of the upstream and downstream interfaces is transmitted at a different wavelength by the other of the upstream and downstream interface.

Figure 5:
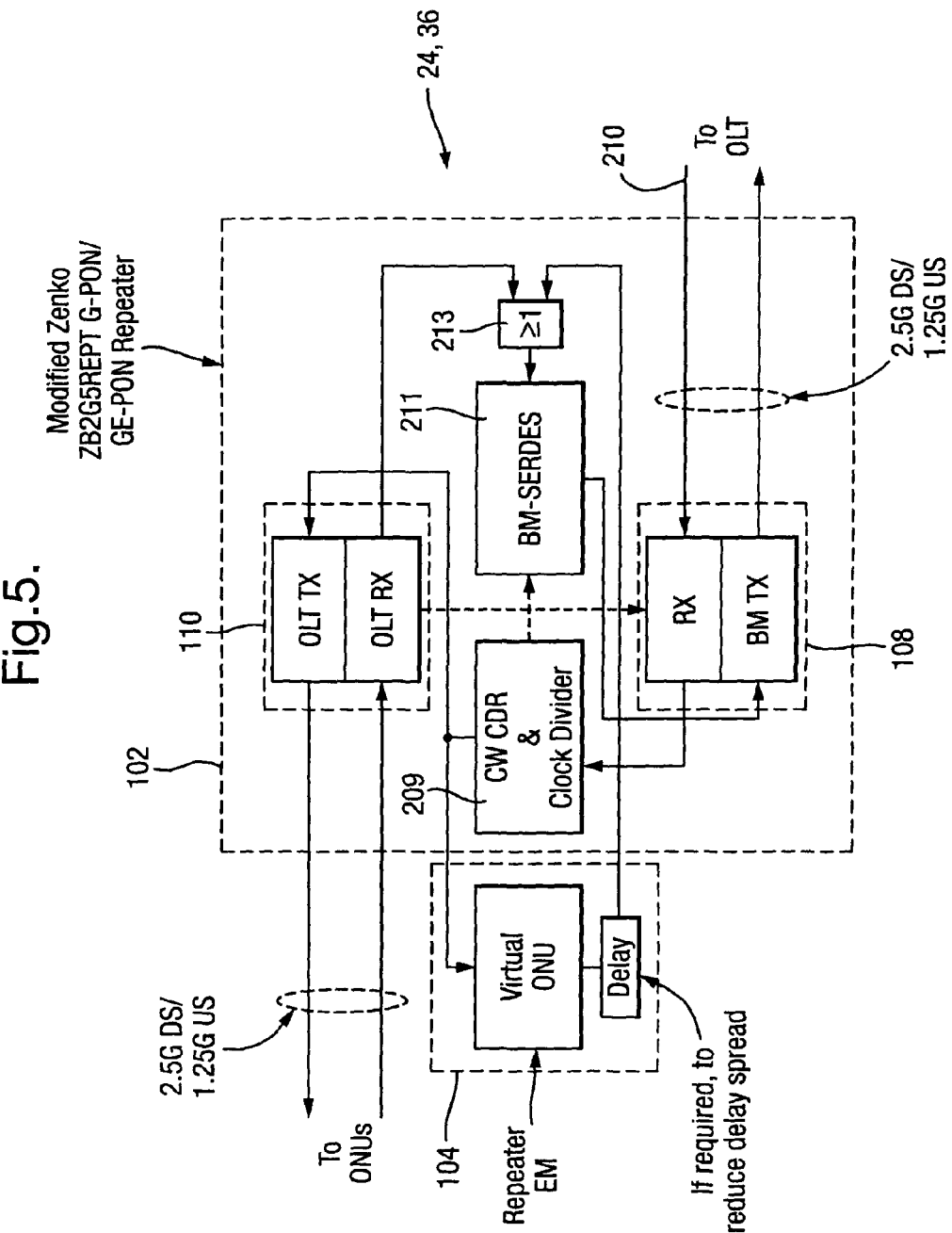
FIG. 5 shows in more detail functional blocks in the repeater of FIG. 4.

FIG. 5 shows in further detail one embodiment of the repeater 24, 36 of FIG. 4, in which components corresponding to those of FIG. 4 are given corresponding numerals. The repeater module 102 is based on an existing repeater module (such as the ZB2 G5REPT made by Zenko) having a clock and data recovery unit 209 for recovering the clock signal and data in the downstream signal stream, and a processing unit 211 for re-generating upstream data using the clock signal from the clock and data recovery unit 209. However, instead of downstream data from the interface 110 simply being fed to the processing unit as is the case with a conventional repeater, an OR function is performed at an OR gate 213 on the downstream data with data from the management module 104. This allows data from the management module to be inserted into the signal stream in the downstream direction. The management module is connected to the clock and data recovery unit 209 in order to obtain a copy of the upstream continuous wave signal. A delay stage may be provided between the management module and the processing unit to simulate the delay expected with a real ONU due to the additional optical fibre length (and the consequent transit time) downstream of the repeater.

Figure 6:
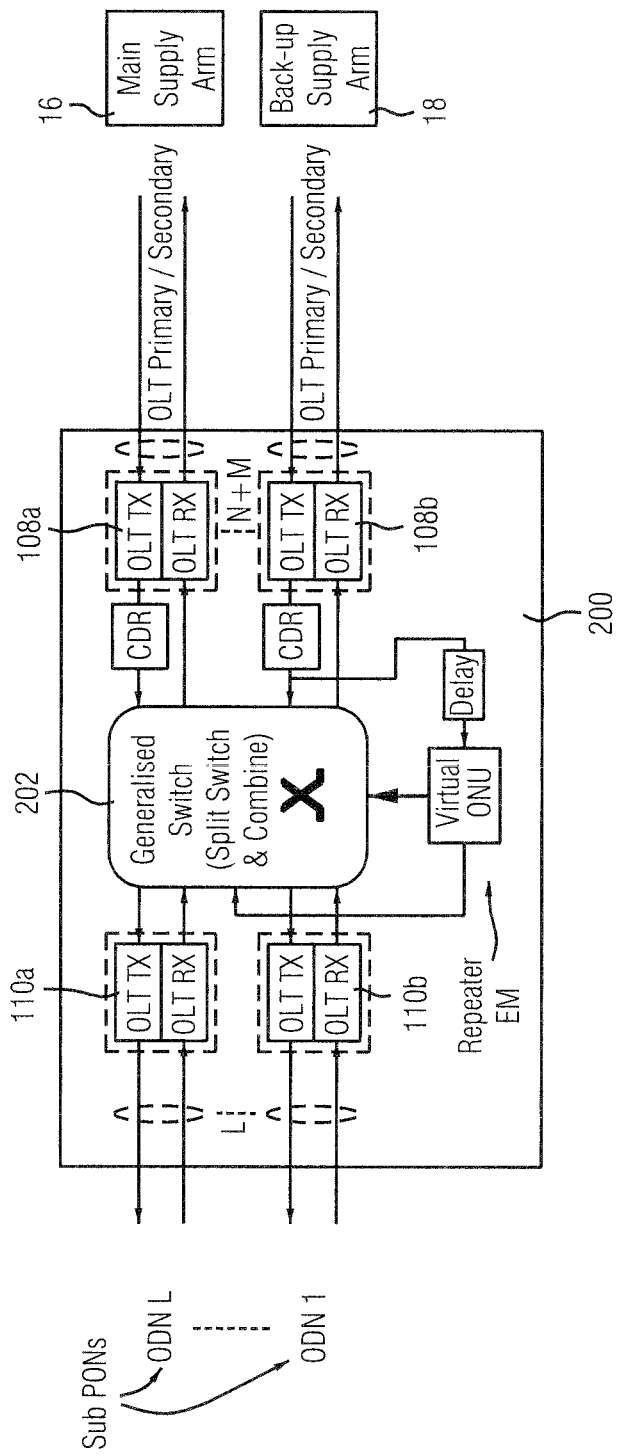
FIG. 6 illustrates a further embodiment.

The above scheme can be extended to N:M protection switching by employing optical or electronic switching between the protection path repeater(s) and the PON splitters, and or by introducing optical or electronic switching on the OLT-side of the repeater(s). In this connection, FIG. 6 shows an optical communications system in which a plurality of supply arms 16, 18 are each connectable to one of a plurality of optical distribution networks (ODN 1, ODNL) through an opto-electronic switching unit 200 or router. Each ODN can be viewed as a sub PON. The switching unit has a plurality of upstream opto-electronic interfaces 108*a*, 108*b* each for receiving and transmitting optical data to and from a respective supply arm. A plurality of downstream opto-electronic interfaces 110a, 110b are also provided, each for receiving and transmitting optical data to and from a respective optical distribution network. A generalised switch 202 is provided between the upstream and downstream opto-electronic interfaces which allows each given supply arm to be connected to a selected one of the optical distribution networks. The generalised switch is operated in response to signals from a virtual ONU, of the type present in each of the repeaters of FIG. 1a, which can communicate with a central manager (not shown) via a head end of one of the supply arms. Thus, a plurality of optical distribution networks can be protected by a common back up supply arm. In the present case N primary PONs are protected by M standby PONs, but all N+M PONs could be used to carry traffic in normal circumstances, M being increased from 0 as and when required either in fault or for maintenance purposes.

As in the previous embodiments, the virtual ONU is connected to the electrical output of an upstream receiver RX (via a clock and data recovery or CDR circuit), so that the virtual ONU can access the signal stream in electrical domain. An output of the virtual ONU is connected to an upstream transmitter TX in the electrical domain so that the virtual ONU can transmit signals to a head end.

The following additional comments are provided.

The repeater in FIG. 5 corresponds to the repeater 24, 26 shown in FIG. 1. The continuous (CW) downstream optical signal from the OLT is converted into electrical form where clock and data recovery (CDR) is performed in the usual way. Clock and data recovery allows the repeater to function as a 3-R optical regenerator performing re-amplification, re-shaping and re-timing of the incoming data. The recovered clock is also used, along with the receiver burst-detect signal, to synchronise the burst-mode (BM) serializer/deserializer (SERDES) used to regenerate the up-stream data. The PON transmission rates shown in FIG. 5 are for a GPON system operating at 2.488 Gbps downstream and at exactly half this rate upstream. The CW downstream optical signal from the repeater conveys a simple time-division-multiple-access (TDMA) signal that is sent to the ONUs via power splitters in the distribution network. The TDMA signal conveys ONU specific addresses, timing information, management data, and payload data. The BM light (or packets of data) from the ONUs fan-in through the splitter network arriving at the repeater in such a way as to avoid data collisions. This collision free fan-in is achieved via the PON protocol which measures round-trip delay and allocates unique time slots (and up-stream capacity) to each ONU on a needs basis. This protocol also exploits the almost ideal uni-directional transmission properties of light within optical fibres that allows transmission and reception to occur simultaneously.

Because the up-stream and down-stream signals are electrically separated inside the repeater we can also apply the same multiple-access principles in the electrical domain of the repeater. That is, we can create a virtual ONU (V-ONU) that appears just like a real ONU as far as the OLT is concerned, but without the need for any optical transmission or opto-electronic conversions.

In the down-stream direction the V-ONU behaves just like a real ONU by monitoring all of the downstream information and extracting only that which is addressed to it and discarding the rest. All of the downstream information is already available in electronic form at the output of the repeater's CW-CDR module. In the up-stream direction, the V-ONU will have been assigned a precise time window for its communications with the OLT via the PON protocol. Therefore, it merely needs to add its burst-mode electrical data to the input of the SERDES at the same instant it would have transmitted an optical packet. In this way, the repeater's V-ONU is fully synchronised with the PON protocol and appears just like an ordinary ONU as far as the OLT is concerned.

Because the V-ONU interfaces with the PON repeater in the electrical domain it has no impact on the PON power budget. The repeater V-ONU can be arranged to monitor repeater functions such as transmitter and receiver optical power levels (to/from the ONUs and OLT), repeater temperature and supply voltages, perform basic data error monitoring, and allow remote shut-down in the event of major network failures. (For example, there could be two sets of opto-electronics for the primary network connection in order to allow dual parenting to provide network resilience.)

At least one embodiment of the invention can be summarised as follows: it concerns a protected long-reach PON having a plurality of terminals connected to a distribution network that is fed by both a main and back up feed, each feed including a head end and a repeater. The back up head end had access to a ranging table with data previously obtained by the main head end during normal operation, thereby speeding up the switch over in the event of a fault with the main feed. In one embodiment, the repeater has a virtual ONU therein, allowing the back up repeater to be ranged by the back up head end, thereby yet further speeding up the ranging procedure. The main and back up repeaters are sufficiently equidistant from the distribution network to allow the back up head to perform normal scheduling without performing a ranging operation on each of the terminals, even if the different terminals transmit at slightly different wavelengths. This is achieved using the ranging information obtained with regard to the back up repeater.

What is claimed is:

1. A method of operating an optical communications system, the system comprising:
   a distribution network connected to a plurality of terminals;
   a main network arm with a main head-end unit for communicating with the plurality of terminals in an operational state via the distribution network;
   a back-up network arm with a back-up head-end unit arranged to allow communication with the plurality of terminals via the distribution network in the event that the main network arm is faulty, the main and back-up network arms having respectively a main repeater and a back-up repeater, at least the back-up repeater being responsive to signals from the back-up head-end unit so that the back-up repeater can be ranged; and
   the main repeater and the back-up repeater being equidistant from the distribution network;
   the method comprising:
   (a) performing a ranging procedure at the head-end unit so as to acquire synchronisation information for scheduling of transmissions from the plurality of terminals; wherein
   the main head-end unit is located at a first location and the back up head-end unit is located at a second location and that the method further comprises:
   (b) performing a ranging procedure at the back-up head-end unit in order to acquire synchronisation information in respect of the back-up repeater;
   (c) if the main network arm is detected to be faulty, using at least part of the synchronisation information acquired in (a) together with the synchronisation information acquired in (b) to schedule transmissions from the plurality of terminals to the back up head-end unit.

2. The method as claimed in claim 1, wherein
the ranging procedure at the back-up head-end unit in respect of the back-up repeater is carried out before a fault in the main network arm is detected.

3. The method as claimed in claim 1, wherein
the ranging procedure at the back-up head-end unit in respect of the back-up repeater is carried out when the main network arm is in the operational state.

4. The method as claimed in claim 1, wherein
the plurality of terminals transmit at different wavelengths.

5. The method as claimed in claim 1, wherein
a wavelength of different terminals of the plurality of terminals span a range of at least 10 nm.

6. The method as claimed in claim 1, wherein
a wavelength of different terminals of the plurality of terminals span a range of at least 100 nm.

7. The method as claimed in claim 1, wherein
the main and back-up network arms each have a path length associated therewith, and wherein,
when the main network arm is in a normal operational state, the plurality of terminals transmit cells with a guard band between adjacent cells, and wherein
a wavelength difference in relation to the path length of the back-up network arm is such that, in the absence of the back-up repeater, the dispersion due to the wavelength difference would cause a timing irregularity measureable at the back-up head-end unit that is greater than the guard band.

8. An optical communications system comprising:
a distribution network connected to a plurality of terminals;
a main network arm with a main head-end unit configured, in use, to communicate with the plurality of terminals in an operational state via the distribution network;
a back-up network arm comprising a back-up head-end unit arranged, in use, to communicate with the plurality of terminals via the distribution network in the event that the main network arm is faulty; the main and back-up network arms having respectively a main repeater and a back-up repeater, and
the main repeater and the back-up repeater being equidistant from the distribution network;
the main head-end unit being further configured, in use, to perform a ranging procedure in which synchronisation information is acquired for synchronising transmissions from the plurality of terminals and comprising a memory for storing the synchronization information, wherein:
(i) the back-up head-end unit is further configured, in use, to perform a ranging procedure in which synchronisation information in respect of the back-up repeater is acquired for synchronising transmissions from the plurality of terminals and comprising a memory for storing the synchronisation information;
(ii) the main head-end unit is located at a first location and the back up head-end unit is located at a second location; and
(iii) the back-up head-end unit is further configured such that, in use, if a fault is detected in the main network arm then the back-up head-end unit schedules transmissions from the plurality of terminals to the back-up head-end unit using at least part of the synchronisation information acquired with respect to the main head-end unit together with the synchronisation information acquired with respect to the back up head-end unit.

9. The optical communications system as claimed in claim 8, wherein
at least the back-up network arm has an optical path with the back-up repeater therealong for receiving optical signals from the plurality of terminals, converting the received signals into the electrical domain, and re-transmitting the signals in the optical domain at a common wavelength.

10. The optical communications system as claimed in claim 9, wherein
the back-up repeater of the back-up network arm is arranged to communicate with the back-up head-end using a time division multiplexing protocol.

11. The optical communications system as claimed in claim 8, wherein
the synchronisation information acquired by either the main head-end unit or back-up head-end unit is obtained as a result of at least one round trip time measurement.

12. The optical communications system as claimed in claim 11, wherein
the back-up head-end unit is arranged to perform a round trip time measurement with respect of the back-up repeater when the main network arm is in a normal operational state.

13. The optical communications system as claimed in claim 12, wherein
the back-up head-end unit is arranged to use a result of the round trip time measurement to the back-up repeater in order to synchronise the transmissions from the plurality of terminals.

14. The optical communications system as claimed in claim 13 wherein
the main head-end unit is arranged to perform a round trip time measurement in respect of the main repeater, and wherein the back-up head-end unit is arranged so as to have access to a result of the round trip time measurement.

15. The optical communications system as claimed in claim 8, wherein
a management unit is provided that is operatively connected to the main and back-up head-end units for retrieving the synchronisation information from the main head-end unit and passing the synchronisation information to the back-up head-end unit.

16. A method of operating an optical communications system, the system comprising:
a distribution network connected to a plurality of terminals;
a main network arm with a main head-end unit for communicating with the plurality of terminals in an operational state via the distribution network;
a back-up network arm with a back-up head-end unit arranged to allow communication with the plurality of terminals via the distribution network in the event that the main network arm is faulty, the main and back-up network arms having respectively a main repeater and a back-up repeater, at least the back-up repeater being responsive to signals from the back-up head-end unit so that the back-up repeater can be ranged; and
the main repeater and the back-up repeater being within 5 km from the distribution network;
the method comprising:
(a) performing a ranging procedure at the main head-end unit so as to acquire synchronisation information for scheduling of transmissions from the plurality of terminals; wherein the main head-end unit is located at a first location and the back up head-end unit is located at a second location and that the method further comprises:

(b) performing a ranging procedure at the back-up head-end unit in order to acquire synchronisation information in respect of the back-up repeater;

(c) if the main network arm is detected to be faulty, using at least part of the synchronisation information acquired in (a) together with the synchronisation information acquired in (b) to schedule transmissions from the plurality of terminals to the back up head-end unit.

17. An optical communications system comprising: a distribution network connected to a plurality of terminals;

a main network arm with a main head-end unit configured, in use, to communicate with the plurality of terminals in an operational state via the distribution network;

a back-up network arm comprising a back-up head-end unit arranged, in use, to communicate with the plurality of terminals via the distribution network in the event that the main network arm is faulty; the main and back-up network arms having respectively a main repeater and a back-up repeater, and the main repeater and the back-up repeater being within 5 km from the distribution network;

the main head-end unit being further configured, in use, to perform a ranging procedure in which synchronisation information is acquired for synchronising transmissions from the plurality of terminals and comprising a memory for storing the synchronization information, wherein:

(i) the back-up head-end unit is being further configured, in use, to perform a ranging procedure in which synchronisation information in respect of the back-up repeater is acquired for synchronising transmissions from the plurality of terminals and comprising a memory for storing the synchronisation information;

(ii) the main head-end unit is located at a first location and the back-up head-end unit is located at a second location; and (iii) the back-up head-end unit is further configured such that, in use, if a fault is detected in the main network arm then the back-up head-end unit schedules transmissions from the plurality of terminals to the back-up head-end unit using at least part of the synchronisation information acquired with respect to the main head-end unit together with the synchronisation information acquired with respect to the back-up head-end unit.

* * * * *